UNITED STATES PATENT OFFICE.

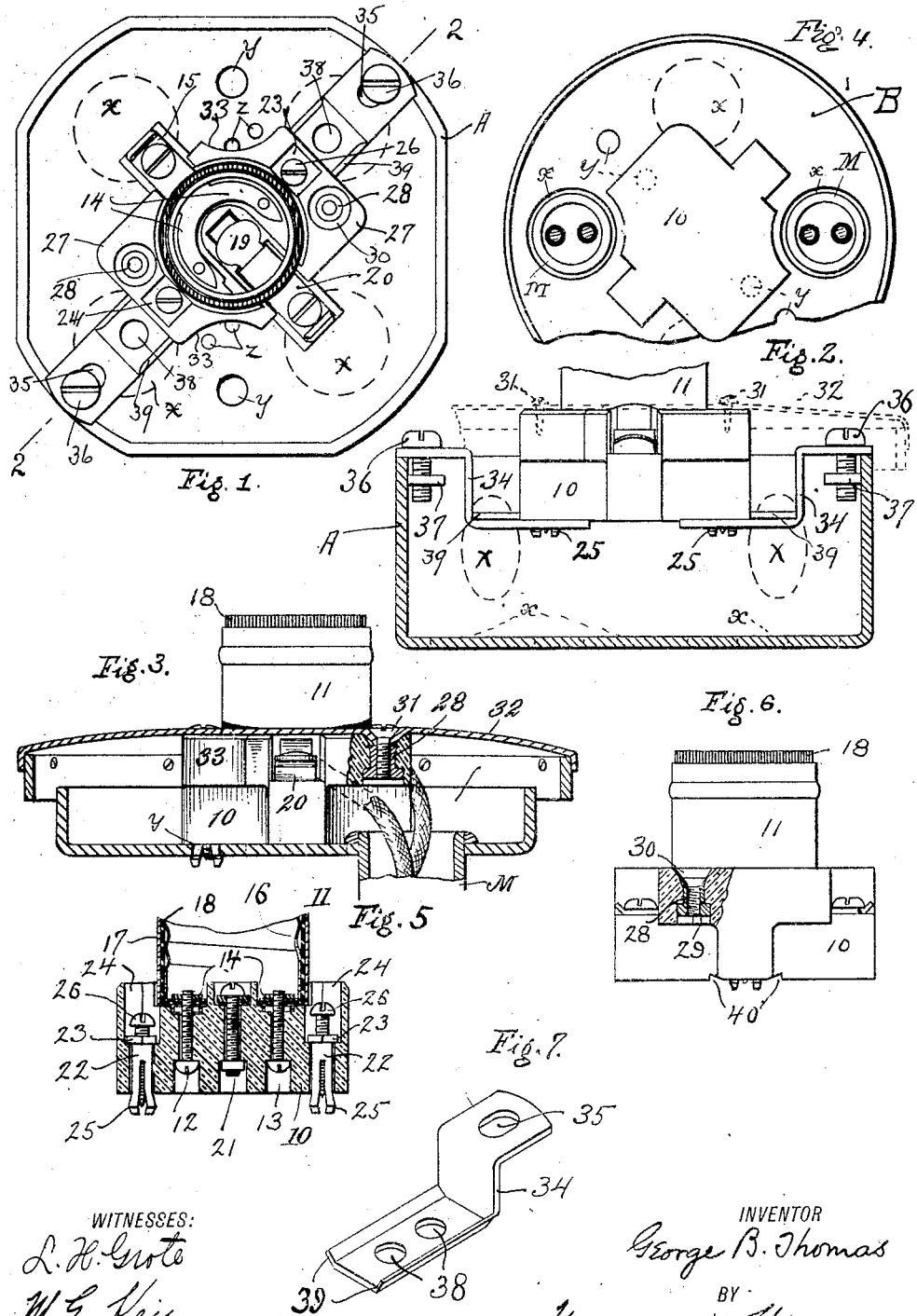

GEORGE B. THOMAS, OF BRIDGEPORT, CONNECTICUT, ASSIGNOR TO THE BRYANT ELECTRIC COMPANY, OF BRIDGEPORT, CONNECTICUT, A CORPORATION OF CONNECTICUT.

OUTLET-BOX FITTING.

1,182,817.  Specification of Letters Patent.  Patented May 9, 1916.

Application filed June 5, 1912. Serial No. 701,864.

*To all whom it may concern:*

Be it known that I, GEORGE B. THOMAS, a citizen of the United States of America, and residing at Bridgeport, in the county of Fairfield and State of Connecticut, have invented a certain new and Improved Outlet-Box Fitting, of which the following is a specification.

My invention relates to outlet boxes for electric wiring systems and particularly to an electric fitting therefor and its mounting in the box, the object of my invention being to provide a fitting of improved type and a more satisfactory mounting therefor in the box.

In the accompanying drawings, Figure 1 is a plan of an outlet box with an electric lamp receptacle mounted therein; Fig. 2 is a vertical section on the line 2—2, Fig. 1; Fig. 3 is a broken elevation of the receptacle mounted in a box of the "pan cake" type; Fig. 4 is a broken plan of the latter; Fig. 5 is a section through the receptacle on the line 2—2, Fig. 1; Fig. 6 is a side elevation of the receptacle partially broken away; and Fig. 7 is a perspective of a supporting bracket.

The outlet boxes A and B illustrated are of the common type provided with knockout discs $x$ which afford ready means for opening apertures in the walls of the box through which the ends of conduits or wire bushings may be inserted for leading in the line wires. These boxes are of standard type and practically uniform construction being provided with a series of plain perforations $y$ and threaded screw holes $z$ by which fittings of various types may be mounted therein. When the outlet box is deep, as in the type A, it is necessary to use a fitting of such size that its outwardly projecting portion shall extend the usual distance beyond the face of the box. Consequently, a fitting that may be employed in a shallow box, such as type B, cannot ordinarily be used in a box of type A. Furthermore it is frequently necessary to install the electric fittings after the boxes have been set in place. If the box has been installed in cement or concrete as is becoming a very common occurrence, it is frequently found that the perforations $y$ and $z$ are plugged full of hard concrete. If an ordinary bolt is employed for securing the fitting in position, this has become now impossible of installation, since the nut cannot be placed beneath the box bottom without cutting away the concrete from behind the box. While if a screw is used, it is necessary not only to clear the perforation $z$ and its threads, but to penetrate the cement a sufficient distance to afford an unobstructed travel for the entering end of the securing screw beyond the lower face of the box. To obviate these inconveniences in installations of the character in question, I now propose to provide means for mounting a fitting of uniform construction on outlet boxes of this type, whether deep or shallow, and which may be readily secured in position even after the box has been installed in concrete or cement. Furthermore, I so mount the fitting that it projects a uniform distance beyond the face of the box whether the latter be shallow or deep. To this end I provide clamping devices carried by the fitting, which may be pushed through the perforations of the box bottom and engaged beneath the latter by means operated wholly from within or from above the box. Where deep boxes are employed I provide supporting brackets carried by the sides of the box and upon which the fitting is mounted.

The outlet fitting shown in the accompanying drawings, is an electric lamp receptacle comprising a base 10 of insulating material, preferably porcelain, upon which the lamp socket 11 is mounted by means of small bolts 12 and 13 passing through the forked arms 14 of the wire terminal 15, the inturned base flanges of the shell contact 16 and the casing 17, the two latter being spaced apart by the insulating lining 18. All danger of contact between the bolts 12 and 13 and the flange 17 of the casing is obviated by making the perforation of the latter through which the bolt passes, of considerably greater diameter than the diameter of the bolt. The down-turned edges of this perforation enter a shallow well in the upper face of the base, whereby a positioning engagement between these parts is secured which facilitates their correct assembly. The center contact 19 of the socket is secured in position and electrically connected to the wire terminal 20 by means of the bolt 21.

Lying outside the socket and piercing the base are two expansion bolts 22 normally maintained in position by the engagement of the shoulders 25 on the spring lower ends and their enlarged rectangular heads 23, below and above the perforations through which the bolts pass. The rectangular heads 23 are seated in rectangular wells 24 so that the bolts are held against rotation during the turning of the screws 26 therein. The corner shoulders 27 of the base are perforated to receive hollow internally-threaded rivets 28, the lower rectangular ends of which are seated in rectangular wells 29 while the upper ends are spread into the coned recess 30, the sides of which form a guide to lead to the threaded portion of the rivet, the entering ends of the screws 31 which hold the cover 32 in position upon the fitting. The other corners of the base are cut away on a curve as at 33 to permit the unobstructed entrance of the conduit ends or bushings M where the receptacle is installed in a shallow receptacle as shown in Fig. 4.

When the receptacle is mounted in a deep box (Fig. 2) I support it upon angled brackets 34, the upper ends of which are slotted at 35 to receive the shank of a securing screw 36 which enters the usual threaded ears 37 on the side wall of the box. The lower portion of the bracket is provided with a plurality of perforations 38 to receive the expanding ends of the bolts 22. Thus the same brackets may be used with boxes of different diameters. Guide means for properly positioning the receptacle on the brackets are provided by angling up the edges of the bracket to form flanges 39 which enter corresponding angled recesses 40 (Fig. 6) in the lower face of the base.

To mount the receptacle in a shallow box it is only necessary to push the spring ends of the bolts 22 through perforations y in the base of the box and then screw home the expansion screws 26 whereupon the shoulders 25 of the bolt engage the lower face of the box bottom and by reason of the incline of these shoulders tend to draw down the base of the receptacle and thus hold it firmly against the box bottom. If the hole y is choked with cement, it is readily cleared sufficiently by the mere rotation of the end of the screw driver in the hole.

To mount the receptacle in a deep box the brackets 34 may be secured in position by their screws 36 and the receptacle then mounted thereon by means of the bolts 22 which enter the perforations 38, or the brackets may be first positioned on the base of the receptacle and then secured to the ears 37 on the side of the box. In either event the flanges 39, engaging the recesses 40 in the base facilitate the correct positioning of the parts and furthermore help to prevent any tendency to swivel on the bolts 22. After the receptacle is thus mounted in the box, the cover 32 is adjusted in position by the screws 31 and the installation is in readiness to receive a lamp.

Various modifications of structure will readily suggest themselves, and the construction shown is to be regarded merely as an exemplary embodiment of my invention.

I claim as my invention:—

1. A fitting for an outlet box of the character described, having an insulating base, terminals carried thereon, means for securing said fitting in said box, said means including an adjustable, readily detachable carrying bracket, the portion of said bracket upon which the fitting base is supported having guide flanges thereon and the base being correspondingly recessed to receive said flange, substantially as described.

2. A fitting for an outlet box of the character described, having a rectangular insulating base, terminals thereon, and means for securing said base within the outlet box, two opposite corners of said base being cut away on an arc to accommodate the entering end of a conduit or wire bushing, together with means in the other corners of said base to receive securing screws for a cover plate, ubstantially as described.

3. A fitting for an outlet box of the character described, having a rectangular insulating base, terminals thereon, and means for securing said base within the outlet box, two opposite corners of said base being cut away on an arc to accommodate the entering end of a conduit or wire bushing, together with means in the other corners of said base to receive securing screws for a cover plate, the lower portions of said latter corners being cut away to afford room for conduit bushings when installed.

4. In an electric installation, an outlet box having a perforated supporting surface, in combination with an electrical fitting having an insulating base and expansion bolts carried thereby with their expansion ends projecting slightly below the lower face of the base whereby they may be inserted in the said perforations, together with screw means for expanding said ends into engagement with the perforated support and thus hold the fitting in rigid position thereon.

In testimony whereof I have signed my name to this specification, in the presence of two subscribing witnesses.

GEORGE B. THOMAS.

Witnesses:
G. W. GOODRIDGE,
H. M. WICHERT.

Copies of this patent may be obtained for five cents each, by addressing the "Commissioner of Patents, Washington, D. C."